(12) United States Patent
Alexander et al.

(10) Patent No.: US 7,401,845 B2
(45) Date of Patent: Jul. 22, 2008

(54) ACTIVE MATERIAL BASED TUNABLE PROPERTY AUTOMOTIVE BRACKETS

(75) Inventors: Paul W. Alexander, Ypsilanti, MI (US); Alan L. Browne, Grosse Pointe, MI (US); Nancy L. Johnson, Northville, MI (US); Nilesh D. Mankame, Ann Arbor, MI (US); Hanif Muhammad, Ann Arbor, MI (US); Thomas Wanke, Gau-Odernheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 99 days.

(21) Appl. No.: 11/554,744

(22) Filed: Oct. 31, 2006

(65) Prior Publication Data

US 2007/0102962 A1    May 10, 2007

Related U.S. Application Data

(60) Provisional application No. 60/733,568, filed on Nov. 4, 2005.

(51) Int. Cl.
*B60R 27/00*    (2006.01)
(52) U.S. Cl. .......................... 296/187.01; 296/187.03; 248/200
(58) Field of Classification Search ............ 296/187.01, 296/187.03; 248/200
See application file for complete search history.

(56) References Cited

U.S. PATENT DOCUMENTS

2006/0125291 A1* 6/2006 Buravalla et al. ............ 296/204
2006/0186700 A1* 8/2006 Browne et al. ......... 296/187.01

\* cited by examiner

*Primary Examiner*—Lori L Lyjak

(57) ABSTRACT

A tunable property bracket for a vehicle body, includes a support member comprising a first active material configured to provide support for static and dynamic loads during normal operation of the vehicle body, wherein the first active material undergoes a change in a property upon exposure to an activating condition during a loading event or a sensed loading event, wherein the change in the property is effective to provide a load bearing capacity change to the support member.

20 Claims, 6 Drawing Sheets

ACTIVE MATERIAL BASED TUNABLE PROPERTY AUTOMOTIVE BRACKETS

CROSS REFERENCE TO RELATED APPLICATIONS

The present application relates to and claims the benefit of priority to U.S. Provisional Application No. 60/733,568 filed Nov. 4, 2005, incorporated herein by reference in its entirety.

BACKGROUND

The present disclosure generally relates to tunable property automotive brackets.

Brackets utilized in and about the front ends of automotive vehicles are commonly formed of a high modulus (stiffness) metal, such as steel. Prior art FIG. 1 illustrates one such bracket, generally designated by reference numeral 10, wherein the entire structure is formed of a high modulus metal, such as steel. Generally, these brackets are disposed intermediate a vehicle frame and a vehicle body, e.g., a fender, hood, headlight, grille, other adjoining components, and the like. The brackets are used to fix and hold such components in proper relative position and support static and dynamic (due to driving inputs) loading of components of the vehicle body relative to the underlying framing members. These static and dynamic loads are related to the inertial masses of the components and thus are in general low, and the bracket stiffness must be greater than what is required by these in order to be effective to prevent dimpling and/or excessive displacement upon an individual leaning or sitting on the vehicle exterior surface. During a discrete rapid short duration loading event of the hood, current brackets, because their stiffness is not tunable, necessarily provide a fixed response, which response is inherent to the properties of the rigid metal used to form the bracket.

It would be desirable to have a tunable bracket that can variously and selectively change the stiffness, yield strength, damping capabilities and/or force/deflection characteristic of a vehicle structural member in cooperative communication therewith. In this manner, the bracket can be used to meet the desired static load requirements for the location of the bracket, yet selectively provide energy dissipation, direction, and absorption properties that are desirable in a rapid loading event or during another situation when a variation in bracket properties would result in advantageous performance.

BRIEF SUMMARY

Disclosed herein are tunable property brackets at least a portion thereof comprised of an active material. In one embodiment, a tunable property bracket for a vehicle body, includes a support member comprising a first active material configured to provide support for static and dynamic loads during normal operation of the vehicle body, wherein the first active material undergoes a change in a property upon exposure to an activating condition during a loading event or a sensed loading event, wherein the change in the property is effective to provide a load bearing capacity change to the support member.

A process for changing an effective stiffness property of a bracket in a dynamic loading condition, includes disposing a bracket intermediate a vehicle body and a vehicle frame, wherein the bracket comprises a fastener and a support member, wherein the support member is configured to matingly engage the fastener, and wherein a selected one or both of the fastener and the support member comprise an active material and are adapted to produce an effective stiffness in a dynamic loading event of the vehicle body, and activating the active material to effect a change in a property of the active material, wherein the change in the property is effective to provide a load bearing capacity change to the bracket.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Figure 1:
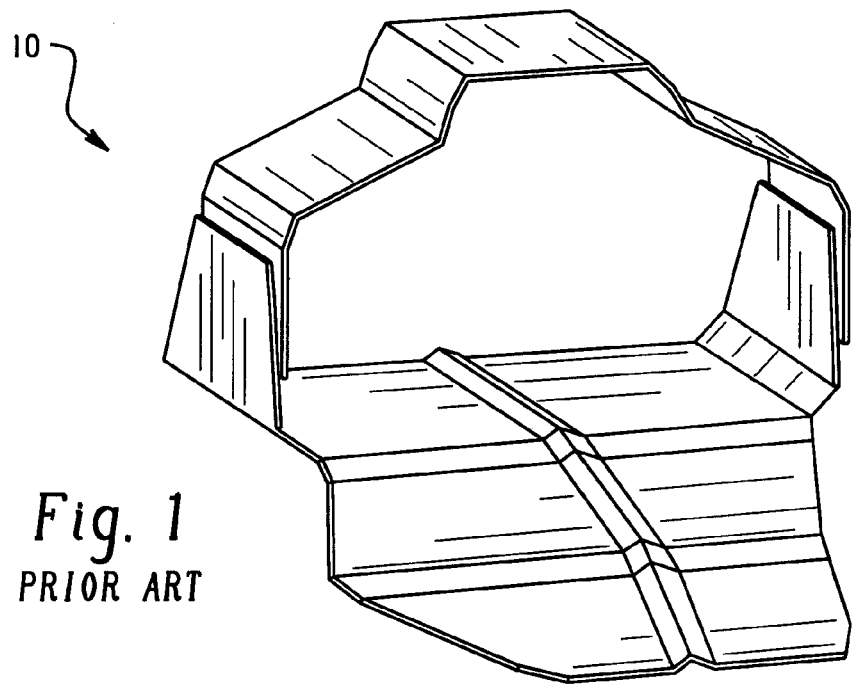
FIG. 1 illustrates a perspective view of a prior art bracket formed of steel.

Active material based tunable property brackets and methods of using tunable brackets are disclosed herein. In contrast to prior art vehicle brackets, the tunable brackets disclosed herein have portions formed of, or are fabricated entirely from, active materials. As used herein, the term "brackets" is intended to include fender brackets, hood bump stops, spacers, and the like, which could be exposed to a deforming load upon a loading event to a vehicle body in cooperative communication therewith, e.g., a hood and fender section of a vehicle. The term "active material" as used herein generally refers to a material that exhibits a change in a property such as a change in an elastic modulus, a shape, a dimension, or a shape orientation upon application of an activation signal. Suitable active materials include, without limitation, shape memory polymers (SMP), shape memory alloys (SMA), ferromagnetic shape memory alloys, electroactive polymers (EAP), piezoelectric materials, magnetorheological elastomers (MR), and electrorheological elastomers (ER). Depending on the particular active material, the activating condition can be passive, such as an environmental change, or an applied activation signal, such as an electric current, a voltage, a temperature change, a magnetic field, and the like.

Also, the term "vehicle body" as used herein generally refers to parts of the vehicle onto which the tunable brackets may be attached, and includes, without limitation, body panels, fenders, and the like. Similarly, the term "vehicle frame" as used herein generally refers to any structural support substrate of the automobile including, without limitation, frame and sub-frame components, chassis, and the like. Also, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges directed to the same quantity of a given component or measurement is inclusive of the endpoints and independently combinable.

The tunable property brackets provide variable-on-demand compliance as a means to meet the competing requirements of stiffness/deformation imposed by static/normal service and dynamic loading during normal operation with the different requirements of dynamic loading events. Typical dynamic loading during normal operation can include, but is not intended to be limited to, any loading that might occur while a vehicle is being operated under normal driving conditions, such as when the vehicle is stationary, idling, traveling during ordinary operation, and the like. For static loading conditions, the bracket must be sufficiently stiff to satisfy the static load bearing requirements, i.e., prevent permanent deformation of the vehicle body upon various weight loads, such as an individual sitting on the hood or fender, or a hand, body or other body part leaning against the hood/fender. The bracket must further be sufficiently stiff to lock a vehicle body in alignment relative to a vehicle frame during assembly. For dynamic loading conditions such as vehicle vibrations that occur during driving or a discrete rapid loading event it is desirable that the properties of the tunable bracket dramatically change to provide energy absorption and damping capability.

The term "shape memory polymer" generally refers to a polymeric material, which exhibits a change in a property, such as an elastic modulus, a shape, a dimension, a shape orientation, or a combination comprising at least one of the foregoing properties upon application of an activation signal. As will be described in greater detail below, SMPs exhibit a dramatic drop in modulus when heated above a glass transition temperature of one of its constituents that define the shape memory polymer. The glass transition temperature that is exceeded is generally the lowest glass transition temperature.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be shaped. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent from the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

Optionally, the SMP can be selected to provide stress-induced yielding, which may be used directly (i.e. without heating the SMP above its thermal transition temperature to 'soften' it) to make the SMP component deform in a preferred manner, conform to a given surface, etc. The maximum strain that the SMP can withstand in this case can, in some embodiments, be comparable to the case when the SMP is deformed above its thermal transition temperature.

Suitable shape memory polymers can be thermoplastics, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methaciylate), poly(ethyl methacrylate), poly(butyl methacrylate), poly(isobutyl methacrylate), poly(hexyl methacrylate), poly(isodecyl methacrylate), poly(lauryl mnethacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) diniethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like. The polymer(s) used to form the various segments in the SMPs described above are either commercially available or can be synthesized using routine chemistry. Those of skill in the art can readily prepare the polymers using known chemistry and processing techniques without undue experimentation.

Depending on the kind of crosslinks, shape-memory polymers can also include components that are thermoplastic elastomers or thermosets. Exemplary thermosets include polystyrenes, polyurethanes, polyimides, and the like.

As will be appreciated by those skilled in the art, conducting polymerization of different segments using a blowing agent can form a shape memory polymer foam, for example, as may be desired for some applications. In this manner, the bracket itself can be a block of foam or other foam shape as may be desired for the placement of the bracket. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N'dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen gas, and the like.

Figure 2:
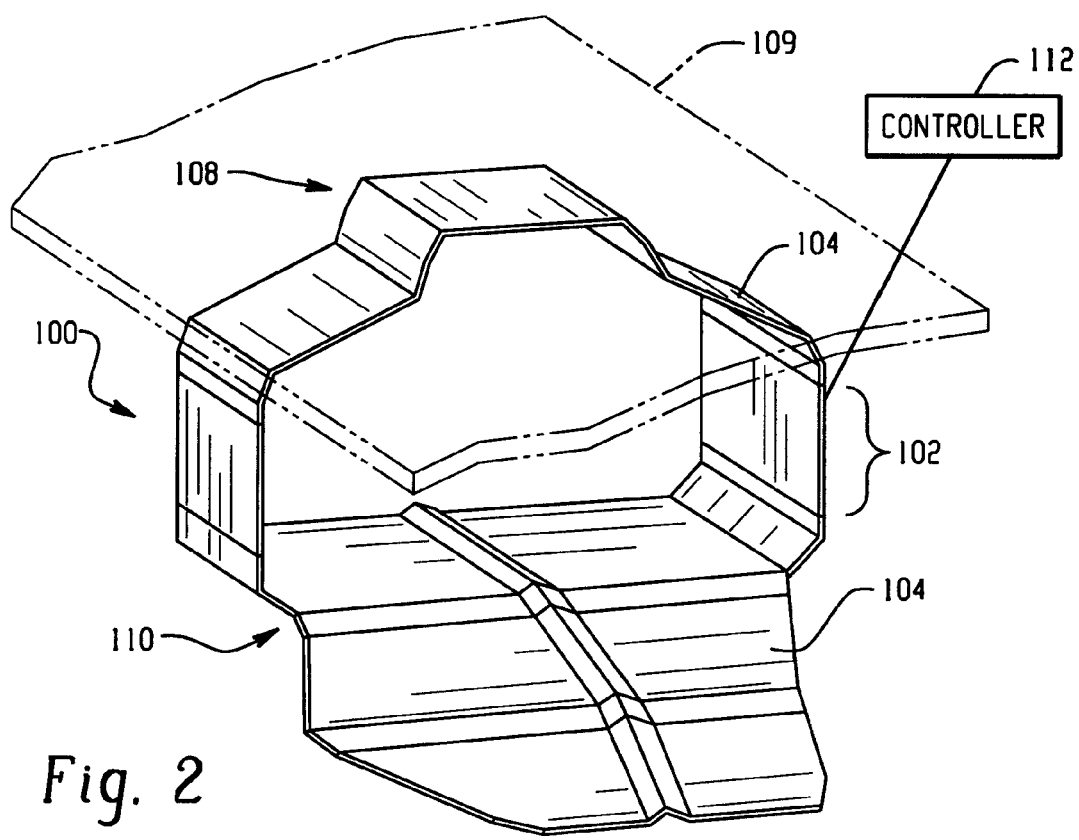
FIG. 2 illustrates a perspective view of a bracket in accordance with one embodiment of the present disclosure.

Turning now to FIG. 2, an exemplary embodiment of a tunable bracket 100 is illustrated. In this embodiment, a support portion 102 of the bracket 100 is formed of an active material, e.g., a SMP, which can take any form (e.g., foam, laminate, solid, composite, and the like). In one embodiment, the SMP portions 102 of the bracket 100 include load-bearing sections, i.e., the sidewall portions as shown. The remainder 104 is formed of a material typically employed to make the bracket, e.g., metal, plastic, and the like. The bracket 100 can be secured to one end 108 of the bracket to a vehicle body 109, e.g., a fender, through spot welding, adhesives, fasteners, and the like. The other end 110 of the bracket 100 can similarly be secured to a vehicle frame, e.g., an underlying surface of the framing member through spot welding, fasteners, adhesives, and the like. The other end 110 is generally contoured to mate with the underlying surface of the vehicle frame and may include a flange. Optionally, a controller 112, can be in operative communication with the SMP portions 102 to supply an activation signal to the SMP.

In another embodiment, the entire bracket 100 structure is formed of the active material, e.g., SMP. As such, the structure defining the bracket 100 can be made entirely of SMP, have localized regions or sections made of SMP, or have reinforcing strips, patches, and the like formed of SMP attached to the bracket surfaces, all of which change the load stress properties of the bracket. The SMP is below the lowest glass transition temperature at normal operating temperatures of the vehicle.

Figure 3A:
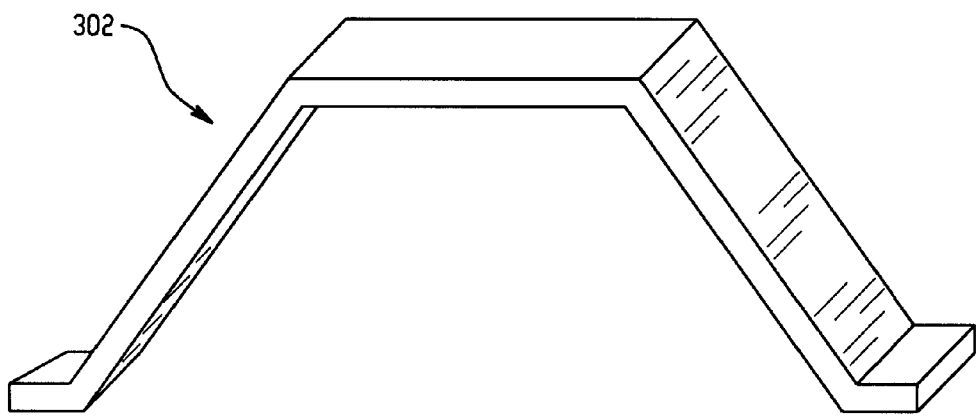
FIG. 3 illustrates a perspective view of (A) a bracket and (B) an end portion of the bracket, in accordance with one embodiment of the present disclosure.
Figure 3B:
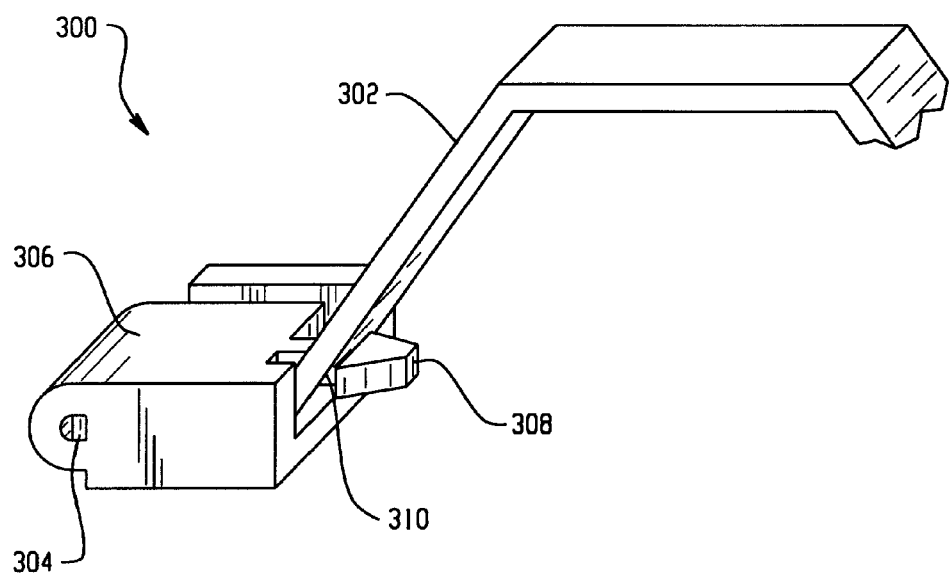

FIG. 3 depicts another exemplary embodiment of a tunable bracket 300. In this embodiment, a support member 302, as shown in FIG. 3A, having a support leg 304, is attached to a vehicle frame (not shown) by a fastener 306, formed of an active material. The support member 302 illustrated in FIG. 3A is intended to have the same shape as the support members 402, 502, and 602 of FIGS. 4 through 6. FIGS. 3B through 6 show the support member legs to better illustrate the fasteners of each embodiment. The active material based fastener 306 has a protrusion 308 configured to engage an aperture 310 of the support leg 304. In this embodiment, the support member 302 can also be formed of an active material, or alternatively, can be formed on or attached to any material suitable for use in automotive brackets, such as steel, aluminum, and the like. In operation, the active material based fastener 306 is configured to release the support member 302 when activated and subjected to a predetermined dynamic loading. This releasable active material based fastener advantageously provides the tunable bracket with greater deflection and deformation than the rigid prior art bracket, such as that shown in FIG. 1.

Figure 4:
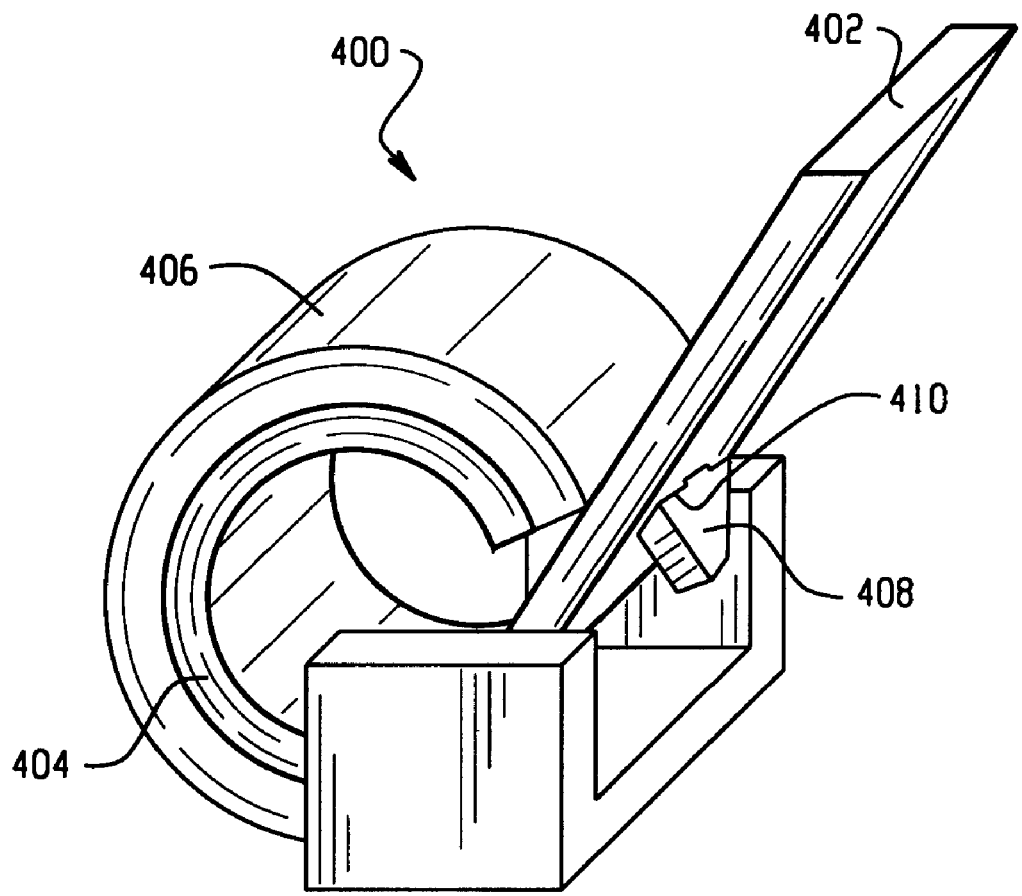
FIG. 4 illustrates a perspective view of the end portion of a bracket in accordance with one embodiment of the present disclosure.
Figure 5:
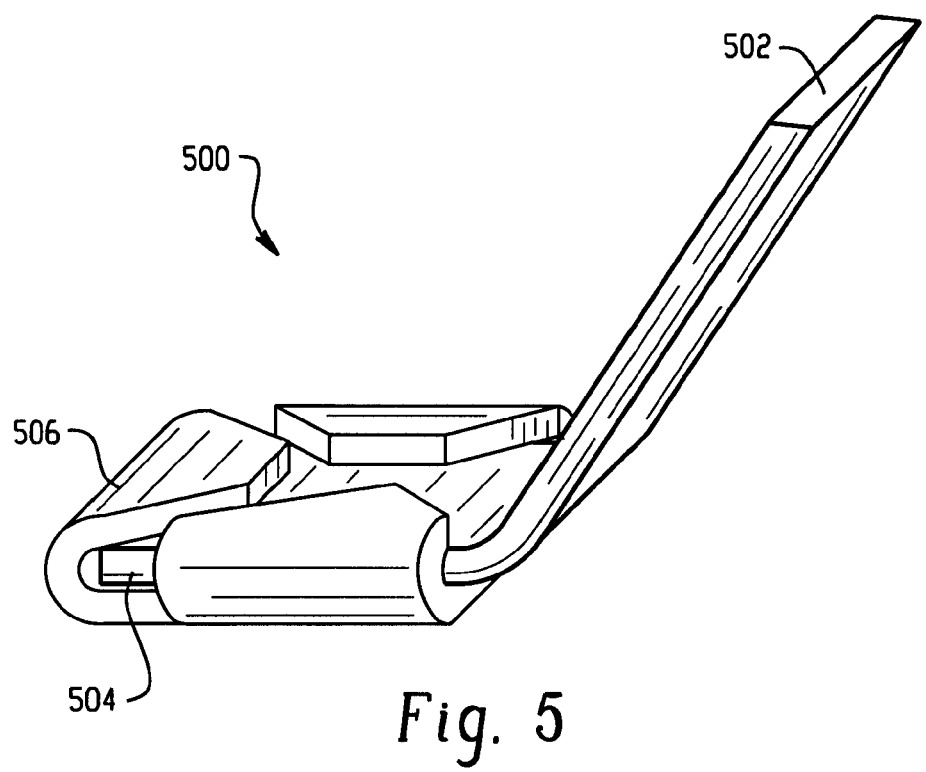
FIG. 5 illustrates a perspective view of the end portion of a bracket in accordance with one embodiment of the present disclosure.
Figure 6:
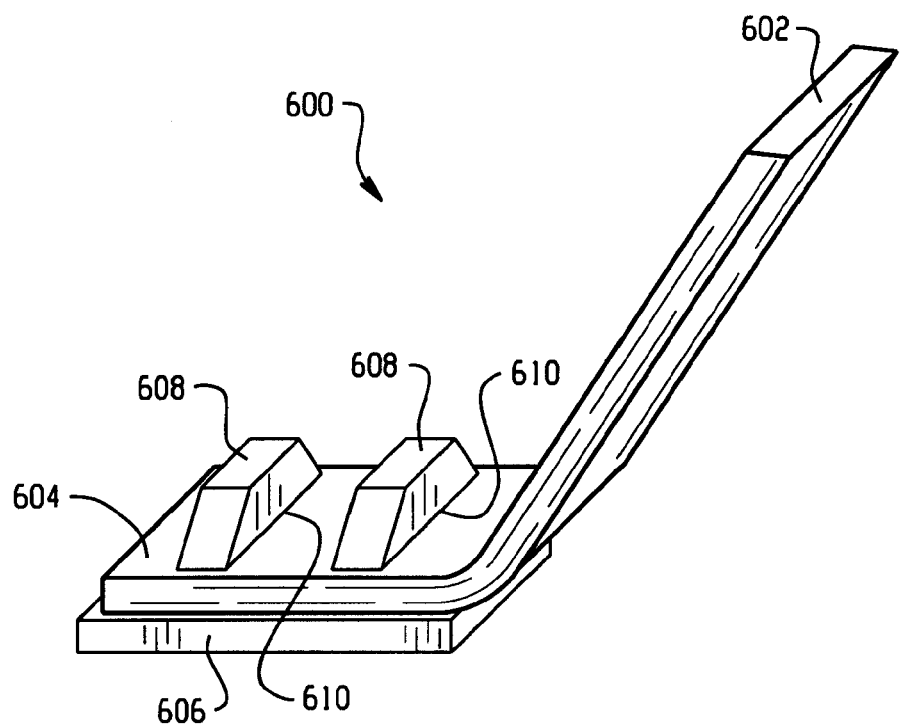
FIG. 6 illustrates a perspective view of the end portion of a bracket in accordance with one embodiment of the present disclosure.

Additional embodiments of the active material based fasteners are shown in the tunable property brackets 400-800, in FIGS. 4-8. These figures depict some potential embodiments of the fasteners, but they are not intended to limit the fasteners to the particular shapes shown. In FIG. 4 the support member 402 has a curved leg 404. The active material based fastener 406 has a protrusion 408 shaped to correspond to the curved leg 404 and engage an aperture 410 of the support member 402. In FIG. 5, the active material based fastener 506 is configured to matingly engage the support member 502 having a leg 504. In yet another embodiment, FIG. 6 illustrates a support member 602 having a leg 604. Each leg 604 has apertures 610. The active material based fastener 606 has protrusions 608 configured to engage the apertures 610 of the support member 602.

Figure 7A:
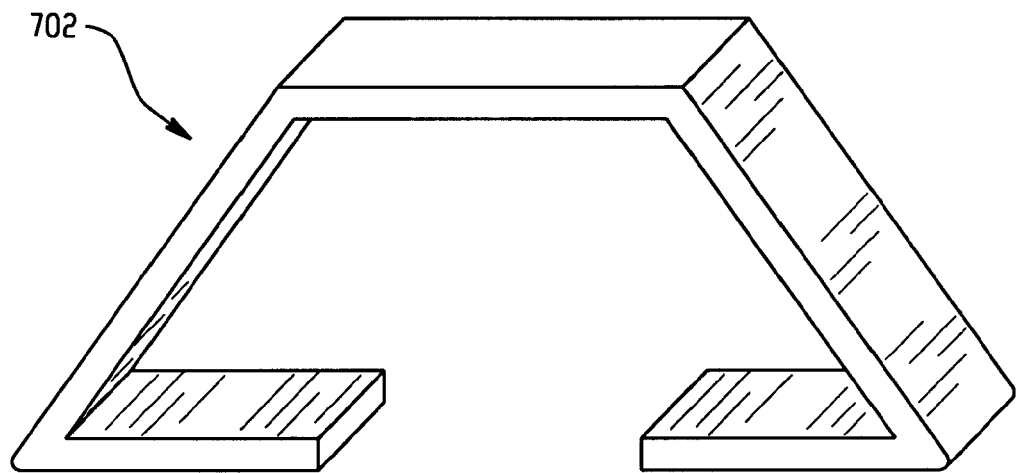
FIG. 7 illustrates a perspective view of (A) a bracket and (B) an end portion of the bracket, in accordance with one embodiment of the present disclosure.
Figure 7B:
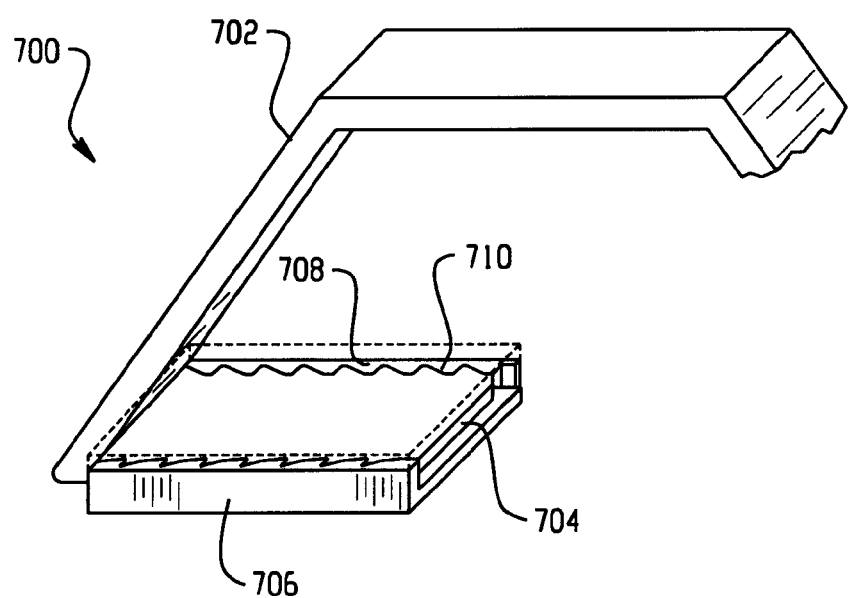
Figure 8:
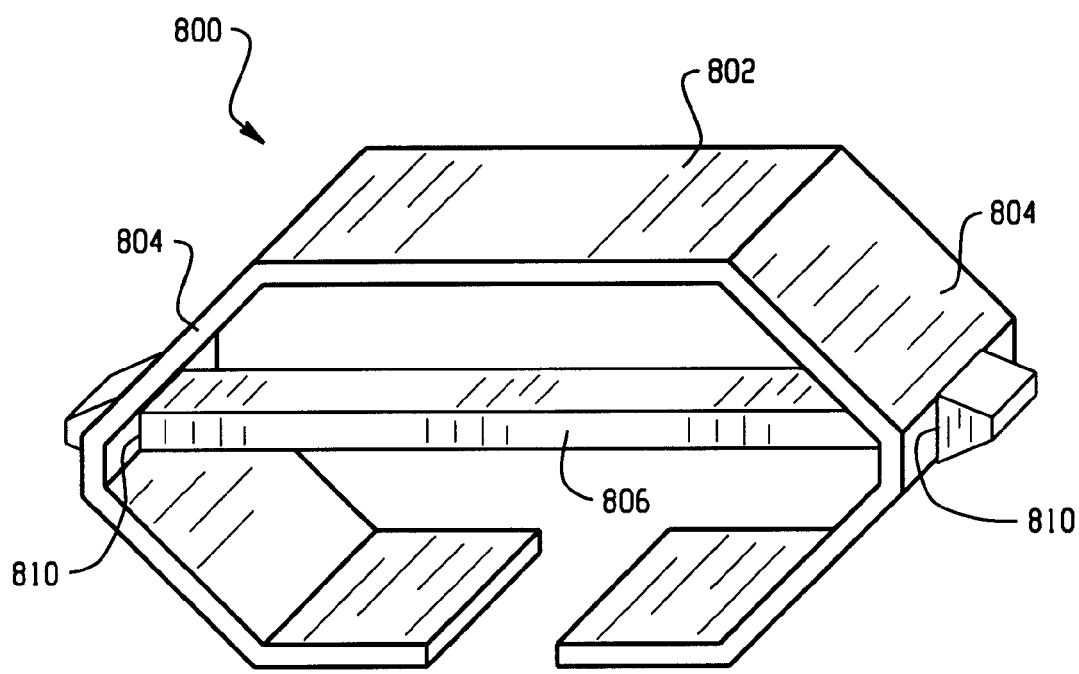
FIG. 8 illustrates a perspective view of a bracket in accordance with one embodiment of the present disclosure.

FIG. 7 depicts a support member 702, as shown in FIG. 7A, having a leg 704. FIG. 7B shows the leg 704 of the support member 702 to better illustrate the fastener 706. The leg 704 has serrated teeth 710. The active material based fastener 706 has serrated teeth 708 configured to matingly engage the serrated teeth 710 of the support leg 704. Finally, FIG. 8 illustrates a support member 802 having legs 804. Each leg 804 has an aperture 810. In this embodiment, one active material fastener 806 is configured to engage each aperture 810 of the legs 804. The above-described tunable brackets may comprise multiple fasteners for securing each end of the support member. Alternatively, one support leg may be statically fixed to the vehicle frame, while another leg is releasably engaged to an active material based fastener.

In operation, decreasing the section load bearing capacity, or crush strength/energy absorption, or stiffness of the bracket can be made through a temperature-activated decrease in the modulus of the SMP, independent of a change in the tunable bracket cross section geometry. In another embodiment, changes in bracket geometry can be selectively made using the thermally activated load bearing capacity (modulus) changes in the SMP. In forming the bracket, stresses locked in elastically deformed elements of the structure by the SMP when in its higher stiffness lower temperature state can be freed to produce a change in the geometry of the structural element. The combination of a change in shape and a decrease in modulus may yield greater changes in the stiffness of the section than could be obtained solely through changes in the modulus or section geometry alone. The change in geometry can be either local or global. Local changes in geometry could act as crush initiators. Crush initiators, most frequently based on local changes in cross section geometry, can alter yield strength and force/deflection characteristics. Various approaches for using SMPs for crush initiation include, but are not limited to, the bracket having localized circumferential bands of SMP, having localized externally attached bands of SMP, being made entirely of SMP, and having externally attached patches made of SMP.

In another method, the temperature induced modulus decrease in the SMP can be used to produce a localized decrease in bracket stiffness, thereby shifting the point of crush/deformation initiation to a different location and/or shifting the manner in which crush initiates. For example, a bracket can be designed with a short segment of SMP, which at room temperature would have a stiffness equivalent to that of the surrounding structure. Under static loads, such as that imposed in "palm dimple analysis" of the fender, it would act in an equivalent manner as the surrounding sheet metal. However, under dynamic loading conditions such as vehicle vibration or upon a discrete rapid loading event, when a less stiff response is desired, the high temperature lower modulus response of the SMP would allow it to act as a visco-elastic dampener, a hinge, or crush initiator because of its dramatically lower modulus.

In yet another mode of operation, the SMP support members and/or leg fasteners can provide alignment and locking capabilities in the vehicle assembly process. The SMP support member and/or fasteners can be heated during the vehicle assembly process, thereby lowering the modulus and permitting a vehicle body e.g., a fender, supported by the tunable bracket to be positioned/aligned relative to a vehicle frame. While in this newly aligned position, cooling the active elements of the bracket will cause them to stiffen, locking the bracket in the newly aligned position and providing a path to transfer static load on/from the fender to the vehicle frame. Such capability allows the vehicle body to be reversibly realigned throughout the vehicle's life.

As indicated, the dramatic change of load bearing capacity in SMP occurs through thermal activation. To produce the required change in temperature, the SMP can be resistively heated, radiatively heated, and/or conductively heated using such means that include, but are not intended to be limited to, conduction from a higher or a lower temperature fluid (e.g., a heated exhaust gas stream), radiative heat transfer, use of thermoelectrics, microwave heating, and the like. Such activation of the SMP can occur passively or actively upon exposure to an activating condition. The activating condition could occur passively through exposure to environmental changes, for example, radiative heating of the SMP above its transition temperature through an increase in environmental temperature due to the close proximity of an engine at an elevated temperature. Alternatively, a controller can be used to selectively apply an activation signal, e.g., a thermal activation signal, to the SMP. The controller may have different control algorithms based on a variety of possible sensor inputs. which could be used to initiate the thermal activation. Various forms of sensor inputs that could be used in deciding whether activation should occur include vehicle operation and status inputs such as speed, yaw rate, ABS operation, weather conditions, etc., prediction of an increasing probability of an imminent loading event, for example, on input from a radar or vision based object detection system, telematics, speed limit signs, and the like), and finally, a signal from an on-board sensor that a loading event has started to occur. The amount of time that is available for thermo-molecular relaxation that underlies the change in modulus in the SMP decreases as the probability of such an event increases. Resistive and pyrotechnic heating means, therefore, are two activation signals that can provide SMP activation times of 0.5 seconds or less.

Optionally, the SMP can be preconditioned. As used herein, the term "preconditioning" generally refers to minimizing the additionally thermal energy required to transition the SMP to a lower modulus state. For example, the SMPs can be maintained at a preconditioning temperature just below the glass transition temperature. In this manner, the activation signal, e.g., a thermal activation signal, requires minimal energy to effect thermal transformation since the transformation temperature is only slightly greater than the preconditioning temperature. As such, preconditioning minimizes the amount of additional heating and time necessary to cause transformation of the SMP, thereby providing a rapid response on the order of a few milliseconds, if desired. In a preferred embodiment, the preconditioning does not cause any transformation of the SMP, unless intentionally designed.

For tunable stiffness brackets based on thermal activation signals, such as may be the case with SMPs, maintaining the preconditioning temperature below the transformation temperature may comprise providing a secondary activation signal at a level below that which would normally cause transformation of the SMP. In this manner, a primary activation signal can then be provided to effect modulus change, wherein the primary signal would require minimal energy and time. In an alternative embodiment, the environment in which the tunable bracket is disposed can be maintained at a temperature below the transformation temperature. In either embodiment, preconditioning can comprise a temperature sensor and a controller in operative communication with the tunable bracket. A feedback loop may be provided to the controller so as to provide the secondary activation signal if so configured. Otherwise, the temperature sensor and controller can precondition the environment to minimize the time to transition the SMP to its transformation temperature by means of the primary activation signal. The preconditioning may be static or transient depending on the desired configuration.

The preconditioning temperature is greater than about 50 percent of the temperature difference between the ambient temperature and the (lowest) glass transition temperature, with greater than about 80 percent preferred, with greater than about 90 percent more preferred, and with greater than about 95 percent even more preferred.

The controller can be programmed to cause activation of the SMP portion defining the bracket within the desired times suitable for the intended application. For example, the controller can be programmed to provide either a high current or a low current to a resistive heating element in thermal communication with the SMP. The high current could be used to provide rapid irreversible activation whereas the low current could be used to provide delayed reversible activation. The use of the high and low current in the manner described is exemplary and is not intended to limit the programming variety available for the controller or to define the conditions for reversibility.

Sensor inputs can be varied in nature and number (pressure sensors, position sensors (capacitance, ultrasonic, radar, camera, etc.), displacement sensors, velocity sensors, accelerometers, etc.) and be located on a vehicle body, e.g., a fender.

Although reference has been made to shape memory polymers, other shape memory materials can be used in a similar manner. As noted above, other active materials include, without limitation, shape memory alloys, ferromagnetic shape memory alloys, electroactive polymers, piezoelectric materials, magnetorheological elastomers, and electrorheological elastomers. These shape memory materials can be used individually and/or in combination with the SMP to effect the desired changes in stiffness, yield strength, and/or force-deflection characteristics. Exposure to activating conditions such as a thermal activation signal, an electric activation signal, a magnetic activation signal, a chemical activation signal, a mechanical activation signal, and the like, can effect a change in the characteristics of these various active materials.

SMAs and MSMAs can exhibit a modulus increase of 2.5 times and a dimensional change of up to 8% (depending on the amount of pre-strain) when heated above their martensite to austenite phase transition temperature. SMA changes (excluding stress induced superelasticity) are also one-way so that a biasing force return mechanism (such as a spring) may be required to return it (the SMA) to its starting configuration once the applied field is removed.

Piezoelectrics exhibit a small change in dimensions when subjected to an applied voltage. Their response is proportional to the strength of the applied field and is quite fast, capable of easily reaching the thousand hertz range. Because their dimensional change is small (<0.1%), to dramatically increase the magnitude of dimensional change they are usually used in the form of piezo ceramic unimorph and bi-morph flat patch actuators, which are constructed so as to bow into a concave or convex shape upon application of a relatively small voltage. The rapid morphing/bowing of such patches is suitable for rapid actuation though the displacement forces delivered are significantly less than those achievable with SMA's. Note also that piezo patches return automatically to their starting geometry once the field is removed.

EAP's are generally a laminate consisting of a pair of electrodes with an intermediate layer of low elastic modulus dielectric material. Applying a potential between the electrodes squeezes the intermediate layer causing it to expand in plane. EAPs also exhibit a response proportional to the applied field and can be actuated at high frequencies.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tunable property bracket for a vehicle body, comprising:
    a support member comprising a first active material configured to provide support for static and dynamic loads during normal operation of the vehicle body, wherein the first active material undergoes a change in a property upon exposure to an activating condition during a loading event or a sensed loading event, wherein the change in the property is effective to provide a load bearing capacity change to the support member.

2. The tunable property bracket of claim 1, wherein the active material comprises a shape memory polymer, a shape memory alloy, a ferromagnetic shape memory alloy, an electroactive polymer, a piezoelectric material, a magnetorheological elastomer, an electrorheological elastomer, or a combination comprising at least one of the foregoing active materials.

3. The tunable property bracket of claim 1, wherein the change in the property comprises a change in an elastic modulus, a shape, a dimension, a shape orientation, a damping characteristic, a phase change, or combinations comprising at least one of the foregoing properties.

4. The tunable property bracket of claim 1, further comprising a controller in operative communication with the first active material, to provide the activating condition to the first active material, wherein the activating condition comprises a thermal activation signal, an electric activation signal, a magnetic activation signal, a chemical activation signal, a mechanical signal, or a combination comprising at least one of the foregoing activation signals.

5. The tunable property bracket of claim 1, wherein the support member comprises a support leg comprising the first active material.

6. The tunable property bracket of claim 1, wherein the bracket further comprises a fastener in operative communication with a leg of the support member, wherein the fastener comprises the first active material and the support member is free from the first active material, wherein the fastener is configured to release the leg of the support member upon exposure to the activating condition and/or a predetermined load exerted upon the fastener.

7. The tunable property bracket of claim 6, wherein the fastener is configured to matingly engage the support leg.

8. The tunable property bracket of claim 6, wherein the fastener further comprises a protrusion configured to engage an aperture of the support leg.

9. The tunable property bracket of claim 1, wherein the support member further comprises a fastener formed of a second active material in operative communication with the support member, wherein the fastener is configured to release the support member upon exposure to the activating condition and/or a predetermined load exerted upon the fastener.

10. The tunable property bracket of claim 9, wherein the first and second active materials are the same.

11. The tunable property bracket of claim 9, wherein the first and second active materials are different.

12. The tunable property bracket of claim 9, wherein the fastener is configured to matingly engage the support leg.

13. The tunable property bracket of claim 9, wherein the fastener further comprises a protrusion configured to engage an aperture of the support leg.

14. A process for changing an effective stiffness property of a bracket in a dynamic loading condition, the process comprising:
   disposing a bracket intermediate a vehicle body and a vehicle frame, wherein the bracket comprises a fastener and a support member, wherein the support member is configured to matingly engage the fastener, and wherein a selected one or both of the fastener and the support member comprise an active material and are adapted to produce an effective stiffness in a dynamic loading event of the vehicle body; and
   activating the active material to effect a change in a property of the active material, wherein the change in the property is effective to provide a load bearing capacity change to the bracket.

15. The method of claim 14, wherein the active material comprises a shape memory polymer, a shape memory alloy, a ferromagnetic shape memory alloy, an electroactive polymer, a piezoelectric material, or combinations comprising at least one of the foregoing active materials.

16. The method of claim 14, wherein activating the active material to effect a change in a property comprises a change in an elastic modulus, a shape, a dimension, a shape orientation, a phase change, or combinations comprising at least one of the foregoing properties.

17. The method of claim 14, wherein activating the active material is accomplished using a controller in operative communication with the active material, wherein the controller is operable to selectively apply the activating condition to the active material.

18. The method of claim 17, wherein the activating condition comprises a thermal activation signal, an electric activation signal, a magnetic activation signal, a chemical activation signal, a mechanical signal, or a combination comprising at least one of the foregoing activation signals.

19. The method of claim 14, wherein the disposing a bracket intermediate a vehicle body and a vehicle frame further comprises activating the active material to align the vehicle body to a desired position relative to the vehicle frame, and deactivating the active material to maintain the vehicle body in the desired position relative to the vehicle body.

20. The method of claim 14, further comprising preconditioning the active material.

* * * * *